July 20, 1948. B. W. PASNOW 2,445,631
METERING VALVE
Filed May 31, 1946
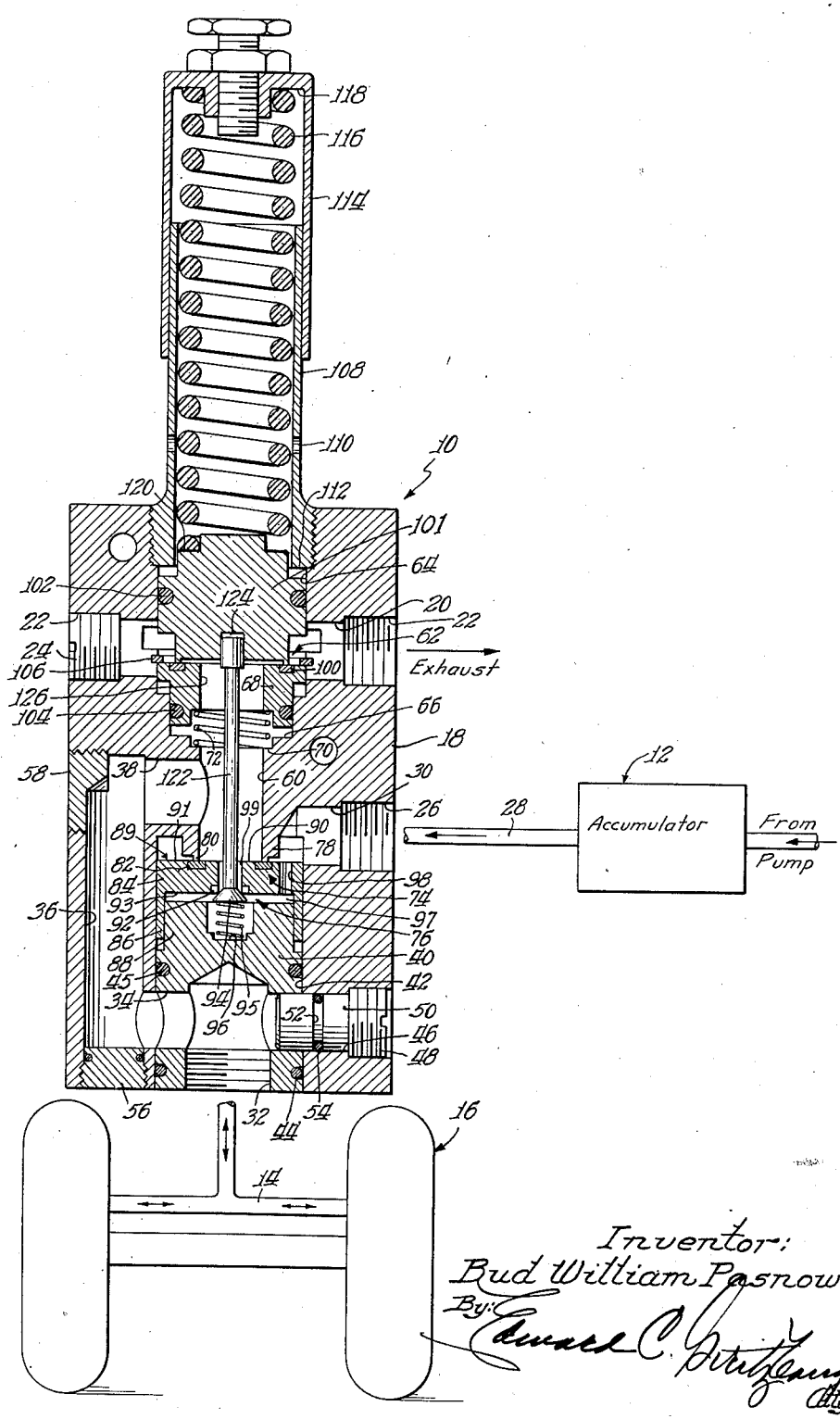
Inventor:
Bud William Pasnow Patented July 20, 1948

2,445,631

UNITED STATES PATENT OFFICE 2,445,631

METERING VALVE

Bud William Pasnow, South Euclid, Ohio, assignor to Borg-Warner Corporation, Chicago, Ill., a corporation of Illinois Application May 31, 1946, Serial No. 673,499

7 Claims. (Cl. 303—54)

This invention relates to valves and more particularly to metering valves which permit the control of fluid under pressure.

Valve mechanisms for use with fluid pressure operated devices, which allow the operator to cause an increase or decrease of fluid pressure delivery to such devices, are known, as are valve mechanisms which additionally permit the operator to maintain a constant pressure in the fluid pressure operated device connected therewith. Valve mechanisms of the latter type have had a common fault in that they fail to keep the pressure constant when set at a desired pressure level. Also they have failed to give smooth operation at the low pressures at which some fluid operated devices, such as brakes, are designed to function.

It is an object of my invention, therefore, to provide a valve mechanism which will permit the operator to smoothly increase or decrease the amount of fluid pressure which is delivered to a fluid operated device. This is made possible by the valve mechanism embodying my invention wherein there is employed a plurality of valves one of which includes a pilot valve.

It is a further object to provide a valve mechanism which will maintain a selected pressure in the fluid operated device. This object is realized by reason of the construction of my valve mechanism which requires no diaphragms or other parts which will tend to vary the operation of the mechanism. Also, because my valve mechanism is so designed that it may be made of a single material, it is particularly well adapted to uses where there are extreme fluctuations of temperature since there is but a single coefficient of expansion for the various parts of the mechanism.

A further advantage arising from my form of valve mechanism which may be constructed of a single material resides in its immunity to electrolysis whereby it is well adapted for chemical usage.

A further object is to provide a valve mechanism of the aforementioned type which will also act precisely and accurately as its own pressure relief valve.

Additional objects, advantages and uses will become apparent from a consideration of the written description when taken in connection with the drawing which shows a sectional view of my valve with fluid pressure connections thereto illustrated in a diagrammatic manner.

Referring now to the drawing the valve mechanism embodying my invention is indicated generally at 10 and has as its source of fluid under pressure an accumulator 12 which is connected to a pump (not shown). Fluid under pressure is delivered from the valve mechanism 10 to a forked conduit 14 which leads the fluid under pressure to the brakes (not shown) of a pair of wheels indicated generally at 16. By way of example, these wheels may be airplane wheels which are adapted to have their brakes operated by the application of fluid under low pressure.

The valve mechanism 10 comprises a housing 18 having an exhaust passageway 20 connected with two exhaust ports 22, the left-hand one of which is shown as being sealed by a plug 24. Either one or both of the exhaust ports 22 may be used. A pressure inlet port 26 connects the conduit 28 from the accumulator 12 with the inlet passageway 30. The forked conduit 14 leading to the brakes of the wheels 16 is connected with the pressure delivery port 32 which port in turn connects with the drilled passageways 34, 36, and 38 in series in the housing 18. The pressure delivery port 32 and drilled passageway 34 are formed in a plug 40 which is positioned in a bore 42 of the valve housing 18, which plug is sealed against the loss of pressure along its external surface by sealing rings 44 and 45 which are disposed on opposite sides of the drilled passageway 34. Threaded into a passageway 46 in the housing 18 is a seal plug 48 which has a shank 50 which extends into the drilled passageway 34 to maintain the plug 40 in the bore 42. Disposed in a groove 52 of the shank 50 is a sealing ring 54. At opposite ends of passageway 36 are positioned seal plugs 56 and 58 respectively.

A chamber or passageway 60 is in direct communication with the passageway 38 and, by passageways 36 and 34, is ultimately in communication with pressure delivery port 32. Chamber 60 is also in communication with the exhaust passageway 20 through a valve, indicated generally at 62, which is located in a stepped bore 64. The stepped bore 64 provides a stop shoulder 66 for one member 68 of the valve 62 while another shoulder 70 forms a seat for the spring 72 which tends to urge upwardly, as viewed in the drawing, the annular valve piston member 68 of valve 62.

Chamber 60 is in communication with the inlet passageway 30 through a valve indicated generally at 74, which valve has a pilot valve indicated generally at 76. It will be seen that the fluid under pressure in passageway 30 may be admitted to the chamber 60 either through the pilot valve 76 or the valve 74. Valve 74 is composed of an annular extension 78 of the housing 18, which extension protrudes into the bore 42 and has a lip 80 for seating against valve seat 82 in the annular valve member 84 which valve member is movable within the bore 42 and is guided therein by a cylindrical apron 86 which has a sliding fit over a reduced end 88 of the plug 40. Annular valve member 84 has an upper surface indicated generally at 89, the radially inner portion 90 of which is subjected to the fluid under pressure in chamber 60 and the radially outer portion 91 of which is subjected to the fluid under pressure in inlet passageway 30. Pilot valve 76 comprises a valve seat 92 on the lower surface 93 of the annular valve member 84 of valve 74 and a movable valve member 94. Movable valve member 94 of the pilot valve 76 is urged onto its seat 92 by a light spring 95 which is seated in a counterbored portion 96 of the plug 40. A chamber 97 is formed between the reduced end 88 of plug 40 and the under surface 93 of annular valve member 84 of valve 74. Inlet passageway 30 communicates with chamber 97 by means of a hole or passageway 98 through the radially outermost portion of annular valve member 84. This permits fluid under pressure in inlet passageway 30 to reach and act upon both the upper surface 89 and lower surface 93 of valve member 84. The passageway 98 is of smaller diameter than the central passageway 99 of valve member 84 for a reason to be given hereinafter.

Valve 62, which is positioned between the chamber 60 and exhaust passageway 20, is composed of the annular valve piston member 68 which has a valve seat 100 against which the valve piston member 101 is adapted to seat. Sealing rings 102 and 104 are secured in the valve piston members 101 and 68, respectively, on either side of the exhaust passageway 20. Pistons 68 and 100 are both slidable within limits in the bore 64. A snap ring 106, secured in housing 18 in the stepped bore 64, limits the upward movement of the valve piston member 68, which is urged toward said ring by the spring 72. Movement of valve piston member 68 in the opposite direction is limited by the shoulder 66 formed in the stepped bore 64.

A cylindrical guide 108 having vent holes 110 is threaded into the upper end of bore 64 and provides a shoulder 112 for limiting upward movement of the valve piston 101. An operator controlled plunger 114 has a sliding fit on the guide 108 and a spring 116 is interposed between the end 118 of the plunger 114 and a shoulder 120 on the valve piston member 101. A rod 122 is connected at one end with the movable valve member 94 of the pilot valve 76 and at its other end is positioned in a counterbore 124 in the valve piston member 101. It will be seen that the rod 122 extends through a passageway 126 in the annular valve piston 68, the chamber 60 and a central passageway 99 of the annular valve piston 84 of valve 74.

Air or other fluid under pressure passes from the accumulator 12 through the conduit 28, port 26 and passageway 30 to the top surface 89 of the valve piston member 84 of the valve 74. This fluid under pressure also passes through the passageway 98 in valve piston member 84 to the chamber 97 and thence to the undersurface 93 of annular valve piston member 84 and to the undersurface of the movable valve member 94 of the pilot valve 76. Consequently, the valves 74 and 76 will be closed. When it is desired to operate the brakes (not shown) for the wheels 16 the operator moves the plunger 114 so as to compress spring 116 and thereby exert a downward force against the valve piston 101 of valve 62. Valve piston member 101 thereupon moves into engagement with the seat 100 carried by the valve piston member 68 thereby closing off the escape of fluid under pressure in chamber 60. Further pressure on the plunger 114 closes the distance between the valve piston 101 and the rod 122 which is connected with the movable valve member 94 of the pilot valve 76. Further downward movement of the plunger 114 will then cause the pilot valve to open, whereupon fluid under pressure in the chamber 97 will flow through the central passageway 99 in the valve piston member 84 into the chamber 60 where said fluid under pressure will also act upon the exposed areas of the valve piston members 68 and 101 of the valve 62 forcing them toward the spring 116 and thereby permitting the movable valve member 94 of the pilot valve 76 to be moved against its seat 92 by the spring 95. Increased pressure on the plunger 114 will cause a repetition of the opening and closing of the pilot valve to permit an increase in pressure within the chamber 60 and its associated passageways 38, 36, 34 and devices communicating therewith.

When the plunger 14 is depressed to such an extent that the pilot valve 76 opens far enough so that the passageway 98 in the radially outermost portion of valve piston 84 cannot supply fluid under pressure to chamber 97 as fast as the central passageway 99 in piston 84 will permit it to escape from chamber 97 to the chamber 60, then the fluid pressure exerted on the top surface 89 of the annular valve piston member 84 will force said piston off its seat allowing fluid under pressure to pass over said surface 89 and under the lip 80 into the chamber 60. This fluid under pressure will act against the exposed surfaces of the valve piston members 68 and 101 of the valve 62 and will urge them upwardly against the spring 116 thus permitting pilot valve 76 and valve 74 to close and thereby stop the further building up of pressure in chamber 60.

To decrease the pressure applied to the brakes of the wheels 16 it is necessary to release a small amount of pressure exerted by the spring 116 and accordingly the operator reduces the pressure upon the plunger 114. This permits the valve piston members 68 and 101 of valve 62 to move upwardly slightly while yet retaining sealing contact with each other. When the valve piston member 68 carrying the seat 100 stops against the snap ring 106, further release of pressure on the spring 116 permits a separation of the valve piston 101 from the valve piston member 68 thus allowing pressure to escape from the valve and out the passageway 20 and exhaust port 22. When the pressure in chamber 60 is thereby reduced sufficiently that the force exerted by said pressure against the valve piston members 68 and 101 is balanced by the force exerted in the opposite direction by the spring 116, the valve 62 will once more be closed so that the pressure will be maintained within the chamber 60. Since there are no diaphragms or other parts which will tend to vary the operation of this mechanism, the pressure will remain the same in chamber 60 and in the associated passageways 38, 36, 34, and in the conduit 14 to the brakes of the wheels 16 until there is a change in the pressure exerted on the plunger 114.

From the foregoing description of the operation of this valve it will be seen that very accurate and smooth applications of pressure may be obtained for applying the brakes to the wheels 16, even though the pressures employed may be low. This is attributable to the construction of my form of valve wherein the pilot valve 76 is employed. In addition, the valve will maintain any desired pressure, the pressure level being determined by the depression of the plunger 114. If an excess of pressure over the predetermined amount is built up, the excess will be discharged through valve 62 automatically. Consequently, it will be seen that my valve mechanism is its own safety valve and that the valve mechanism could be employed purely as a safety valve itself.

While I have illustrated and described a preferred embodiment and one application of my invention, I do not intend that it shall be limited thereto, since certain changes and modifications may be made without departing from the scope of my invention as determined by the appended claims.

I claim:

1. In a valve mechanism, in combination, a valve housing having an inlet passageway connectible to a source of fluid under pressure, an exhaust passageway, a chamber defined by said housing and connected with said passageways and adapted to have the pressure within it regulated, a first valve, said valve being positioned in said exhaust passageway for controlling the exhaust of fluid pressure from said chamber, and comprising a valve piston member and a valve seat member, said two members being movable, means resiliently biasing one of said members toward the other, stronger resilient means for moving the other member toward said one of said members to close the valve, a second valve, said second valve being positioned in said inlet passageway to control the admission of fluid under pressure to said chamber and comprising a valve seat and an annular valve piston having its central passageway closed by a pilot valve, said annular valve piston providing a surface subject to fluid under pressure which tends to open the valve and providing a larger surface subject to fluid under pressure which tends to urge the piston to its seat, means restricting the flow of fluid under pressure to said second-mentioned surface, means operable by movement of the first valve when closed to open said pilot valve, said second valve opening after the pilot valve opens when the fluid under pressure on the first-mentioned surface on said annular valve piston thereafter exceeds the pressure on said second-mentioned surface.

2. In a valve mechanism, in combination, a housing having an inlet passageway connectible to a source of fluid under pressure, an exhaust passageway, and a chamber in which the pressure is to be regulated and which is defined by said housing and connected with said inlet and exhaust passageways, a first valve, said valve being positioned in said exhaust passageway for controlling the exhaust of fluid under pressure from said chamber and comprising a valve piston member and a valve seat member, said two members being movable, means resiliently biasing one of said members toward the other, stronger resilient means for moving the other member toward said one of said members to close the valve, a second valve, said second valve being positioned in said inlet passageway and comprising a valve seat and an annular valve piston having its central passageway closed by a pilot valve, said annular valve piston providing a surface subject to the fluid under pressure which tends to open the valve and providing a larger surface subject to the fluid under pressure which tends to urge the valve piston to its seat, a passageway through said annular valve member from the first-mentioned surface to the second-mentioned surface, said passageway being smaller in diameter than the central passageway through the annular valve member, and means operable by movement of the first valve when closed to open said pilot valve, said second valve opening after the pilot valve opens when the passageway through the annular valve member cannot pass fluid under pressure to said second surface as quickly as the central passageway can pass the fluid under pressure to said chamber.

3. In a valve mechanism, in combination, a housing having an inlet passageway connectible to a source of fluid pressure, an exhaust passageway, and a chamber defined by said housing and connected with said inlet and exhaust passageways, a pair of pistons between said exhaust passageway and said chamber, a valve seat on one of said pistons and a cooperating valve member on the other piston, a passageway in the piston which is adjacent the chamber for connecting said chamber with the exhaust passageway, resilient means for biasing one of said pistons toward the other, stronger resilient means for moving the other piston toward said one of said pistons to close the valve, a valve between said inlet passageway and said chamber and having a pilot valve, a valve member and a valve seat, means positioned between the pilot valve and one of said pistons of said pair of pistons and adapted, when said first valve is closed, to open the pilot valve to admit fluid under pressure from the inlet passageway to said chamber.

4. In a valve mechanism, in combination, a housing having a first passageway which is connectible to a fluid pressure operated device, a second passageway leading from said first passageway to an exhaust port, and a third passageway leading from said first passageway to an inlet port, a first valve, said valve being positioned between said first passageway and said exhaust port of the second passageway and being movable in closed position in said second passageway by operator controlled means, a second valve, said second valve being positioned between said first passageway and the inlet port of the third passageway and having a pilot valve, means connected with the movable member of said second valve and located in the third passageway and serving to restrict the flow of fluid under pressure from the source of fluid pressure to said pilot valve, and means positioned between the pilot valve and the first valve and adapted, when said first valve is in closed position and is moved, to operate said pilot valve.

5. In a valve mechanism, in combination, a housing defining a chamber, a first passageway leading from said chamber and connectible to a fluid pressure operated device, and a second passageway leading from said chamber to an exhaust port; a pair of pistons slidable in said second passageway and forming a first valve between them; one of said pistons being spring loaded so as to urge it toward the other piston; a stop member for limiting movement of said one of said pistons toward said other piston; spring means for moving said other piston toward said one of said pistons to close the valve; a third passageway in said housing leading from said first passageway to an inlet port which is connectible to a source of fluid under pressure; a second valve, a movable pilot valve therefor which is spring loaded to closed position, said second valve being positioned in said third passageway and comprising a stationary valve member, a cooperating annular valve piston member having a fluid passageway therethrough and carrying a valve seat for the pilot valve, said annular piston extending radially beyond the stationary valve member and thereby having a surface on its one side which is acted on by fluid under pressure from said inlet port and having a larger surface on its other side, a hole through the extended portion of said piston from said one side to said other side so that the larger surface may be acted on by fluid pressure, and a member extending between the pilot valve and one of the pistons of the first valve and of such length that, when the first-mentioned valve is closed by said pistons and said pistons are moved toward the pilot valve, said pilot valve is forced open.

6. In a valve mechanism, in combination, a housing defining a chamber, a first passageway leading from said chamber and being connectible with a fluid pressure operated device, and a second passageway leading from said chamber to an exhaust port; a pair of pistons slidable in said second passageway and forming a first valve between them, the piston adjacent said chamber being annular and carrying a valve seat and being spring loaded so as to urge it toward the other piston, said other piston carrying a valve member; a stop member for limiting movement of the piston adjacent the chamber toward said other piston; operator controlled resilient means for moving said other piston toward the piston adjacent said chamber to close said first valve; a third passageway in said housing leading from said first passageway to an inlet port which is connectible to a source of fluid under pressure; a second valve having a movable pilot valve therefor which is spring loaded to closed position, said second valve being positioned in said third passageway and comprising a stationary valve member, a cooperating annular valve piston having a fluid passageway therethrough and carrying on one side a valve seat for said stationary valve member and carrying on its other side a valve seat for said pilot valve, said annular piston extending radially beyond the stationary valve member and pilot valve and thereby having a surface on its said one side which is acted on by fluid under pressure and having a larger surface on its said other side, a hole through the extended portion of said piston from said one side to said other side so that the larger surface may be acted on by fluid pressure, and a member connected with the pilot valve and extending between it and said other piston of the first valve and of such length that, when the first mentioned valve is closed and the pistons forming the valves are moved toward the pilot valve, said pilot valve is forced open, the hole through the extended portion of the annular piston of the second valve being smaller in diameter than the fluid passageway of said annular piston so that the piston may be moved by pressure to unseat the second valve when the pilot valve is open and said fluid passageway passes fluid under pressure to said chamber faster than said fluid can pass through said hole in said annular piston.

7. In a pressure regulating valve assembly, a valve housing having an inlet port adapted to be connected to a source of fluid under pressure, an outlet port, an intervening chamber within said housing in which it is desired to regulate the pressure; a first valve unit in communication with said outlet port for controlling the flow of fluid from said chamber, resilient means urging said first valve in the direction of closing; means defining a second valve unit positioned in communication with said inlet port for controlling the admission of fluid to said chamber, said second valve unit comprising a valve seat in communication with said chamber and facing in the direction of flow from said source of pressure fluid, an annular piston-like valve proper for engaging said seat, a central passage formed in said piston, a pilot valve operable to close said passage, said annular valve piston being further provided with a first pressure responsive surface subject to the pressure from said pressure source tending to move said piston-like valve proper away from engagement with said seat, said piston-like valve proper being further provided with a second larger pressure responsive surface in communication with said central passage and subject to the pressure from said pressure source tending to move said piston-like valve proper in the direction of engagement of said seat, means defining a restricted fluid passage between said two above-named surfaces, said passage having a cross-sectional area less than the cross-sectional area of said central passage formed in said piston-like valve proper, means operable in response to the movement of said first valve effective to open said pilot valve, said second piston-like valve proper being moved to open position in response to the action of fluid pressure on said first-named pressure responsive surface following the opening of said pilot valve.

BUD WILLIAM PASNOW.

REFERENCES CITED

The following references are of record in the file of this patent:

UNITED STATES PATENTS

| Number | Name | Date |
|---|---|---|
| 2,259,809 | Freeman | Oct. 21, 1941 |